US006628289B1

United States Patent
Murata

(10) Patent No.: US 6,628,289 B1
(45) Date of Patent: Sep. 30, 2003

(54) RENDERING APPARATUS AND METHOD, AND STORAGE MEDIUM

(75) Inventor: Masahiko Murata, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 09/603,361

(22) Filed: Jun. 26, 2000

(30) Foreign Application Priority Data

Jun. 29, 1999 (JP) ............................................ 11-184215

(51) Int. Cl.[7] .............................................. G06F 15/80
(52) U.S. Cl. ........................ 345/505; 345/572; 345/561; 710/22
(58) Field of Search ................................. 345/505, 521, 345/561–572, 511, 537, 574; 395/166; 710/1, 22

(56) References Cited

U.S. PATENT DOCUMENTS

| 4,920,480 A | * | 4/1990 | Murakami et al. |
| 5,218,674 A | * | 6/1993 | Peaslee et al. |
| 5,329,615 A | * | 7/1994 | Peaslee et al. |
| 5,911,147 A | | 6/1999 | Onodera et al. ................ 711/5 |

* cited by examiner

Primary Examiner—Matthew C. Bella
Assistant Examiner—Hau Nguyen
(74) Attorney, Agent, or Firm—Fitzpatrick, Cella, Harper & Scinto

(57) ABSTRACT

A rendering apparatus has an image generation unit for generating a source image, an address generation unit for generating the read and write addresses of a bitmap memory, a DMA read unit for directly reading out data from the bitmap memory in accordance with the generated address, an input data holding unit for holding the data read from the bitmap memory, a logic operation unit for making a logic operation on the basis of the read data and data of the source image, an output data holding unit for holding the logically operated data, and a DMA write unit for writing the held data in the bitmap memory in accordance with the generated address, and synchronously processes a data input process for reading out data from the bitmap memory and holding that data in the input data holding unit, the logic operation, and an output process for writing the logic operation result at a predetermined address of the bitmap memory parallel to each other.

15 Claims, 9 Drawing Sheets

RENDERING APPARATUS AND METHOD, AND STORAGE MEDIUM

FIELD OF THE INVENTION

The present invention relates to a rendering apparatus and method for, e.g., a printer which forms an image on a bitmap memory and prints the image, and a storage medium that stores a program for implementing the rendering method on a computer.

BACKGROUND OF THE INVENTION

Conventionally, a rendering apparatus of this type processes in turn a series of operations for reading data on a bitmap memory, logically operating the read data and a generated source image, and writing back the logic operation result at an identical address on the bitmap memory. Upon completion of those operations, the apparatus repeats similar processes.

However, since logic operations come to a halt upon reading data from the bitmap memory or upon writing data on the bitmap memory, and access to the bitmap memory also comes to a halt during execution of logic operations, the image formation efficiency is poor, and high-speed rendering cannot be realized.

SUMMARY OF THE INVENTION

The present invention has been proposed to solve the conventional problems, and has as its object to provide a rendering apparatus for forming an image on a bitmap memory by logically operating a source image and data on the bitmap memory, comprising image generation means for generating the source image, address generation means for generating read and write addresses of the bitmap memory, DMA read means for directly reading out data from the bitmap memory in accordance with the generated address, input data holding means for holding the data read from the bitmap memory, logic operation means for making a logic operation on the basis of the read data and data of the source image, output data holding means for holding the logically operated data, and DMA write means for writing the data held in the bitmap memory in accordance with the generated address, wherein a data input process for reading out data from the bitmap memory and holding that data in the input data holding means, the logic operation, and an output process for writing the logic operation result at a predetermined address of the bitmap memory are synchronously processed parallel to each other.

According to a preferred aspect of the present invention, in the rendering apparatus, the address generation means generates successive addresses when data that undergoes a logic operation process executed at the time of the next data input process is not last data of the current line, and generates an address of the next line when the data that undergoes the logic operation process is the last data of the current line.

According to a preferred aspect of the present invention, the rendering apparatus further comprises a plurality of data holding means for holding input or output data, and process latency due to data storage means which is not empty is removed by selectively using the plurality of data holding means as output or input data holding means.

According to a preferred aspect of the present invention, the rendering apparatus further comprises a plurality of input and output data holding means corresponding to a plurality of data processing units, and a high-speed rendering process is achieved by simultaneously processing the plurality of data processing units.

Alternatively, a rendering method for forming an image on a bitmap memory by logically operating a source image and data on the bitmap memory, comprises the image generation step of generating the source image, the address generation step of generating read and write addresses of the bitmap memory, the DMA read step of directly reading out data from the bitmap memory in accordance with the generated address, the input data holding step of holding the data read from the bitmap memory in an input memory, the logic operation step of making a logic operation on the basis of the read data and data of the source image, the output data holding step of holding the logically operated data in an output memory, and the DMA write step of writing the data held in the output memory in the bitmap memory in accordance with the generated address, wherein a data input process for reading out data from the bitmap memory and holding that data in the input memory, the logic operation, and an output process for writing the logic operation result at a predetermined address of the bitmap memory are synchronously processed parallel to each other.

According to a preferred aspect of the present invention, in the rendering method, the address generation step includes the step of generating successive addresses when data that undergoes a logic operation process executed at the time of the next data input process is not last data of the current line, and generating an address of the next line when the data that undergoes the logic operation process is the last data of the current line.

According to a preferred aspect of the present invention, in the rendering method, a plurality of memories for holding data are provided, and process latency due to a memory which is not empty is removed by selectively using the plurality of memories as output or input memory.

According to a preferred aspect of the present invention, in the rendering method, a plurality of input and output memories corresponding to a plurality of data processing units are provided, and a high-speed rendering process is achieved by simultaneously processing the plurality of data processing units.

Alternatively, a storage medium that stores a rendering program for forming an image on a bitmap memory by logically operating a source image and data on the bitmap memory, the program comprises a code of the image generation step of generating the source image, a code of the address generation step of generating read and write addresses of the bitmap memory, a code of the DMA read step of directly reading out data from the bitmap memory in accordance with the generated address, a code of the input data holding step of holding the data read from the bitmap memory in an input memory, a code of the logic operation step of making a logic operation on the basis of the read data and data of the source image, a code of the output data holding step of holding the logically operated data in an output memory, and a code of the DMA write step of writing the data held in the output memory in the bitmap memory in accordance with the generated address, wherein a data input process for reading out data from the bitmap memory and holding that data in the input memory, the logic operation, and an output process for writing the logic operation result at a predetermined address of the bitmap memory are synchronously processed parallel to each other.

According to a preferred aspect of the present invention, in the storage medium, the code of the address generation step includes the step of generating successive addresses when data that undergoes a logic operation process executed at the time of the next data input process is not last data of the current line, and generating an address of the next line when the data that undergoes the logic operation process is the last data of the current line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
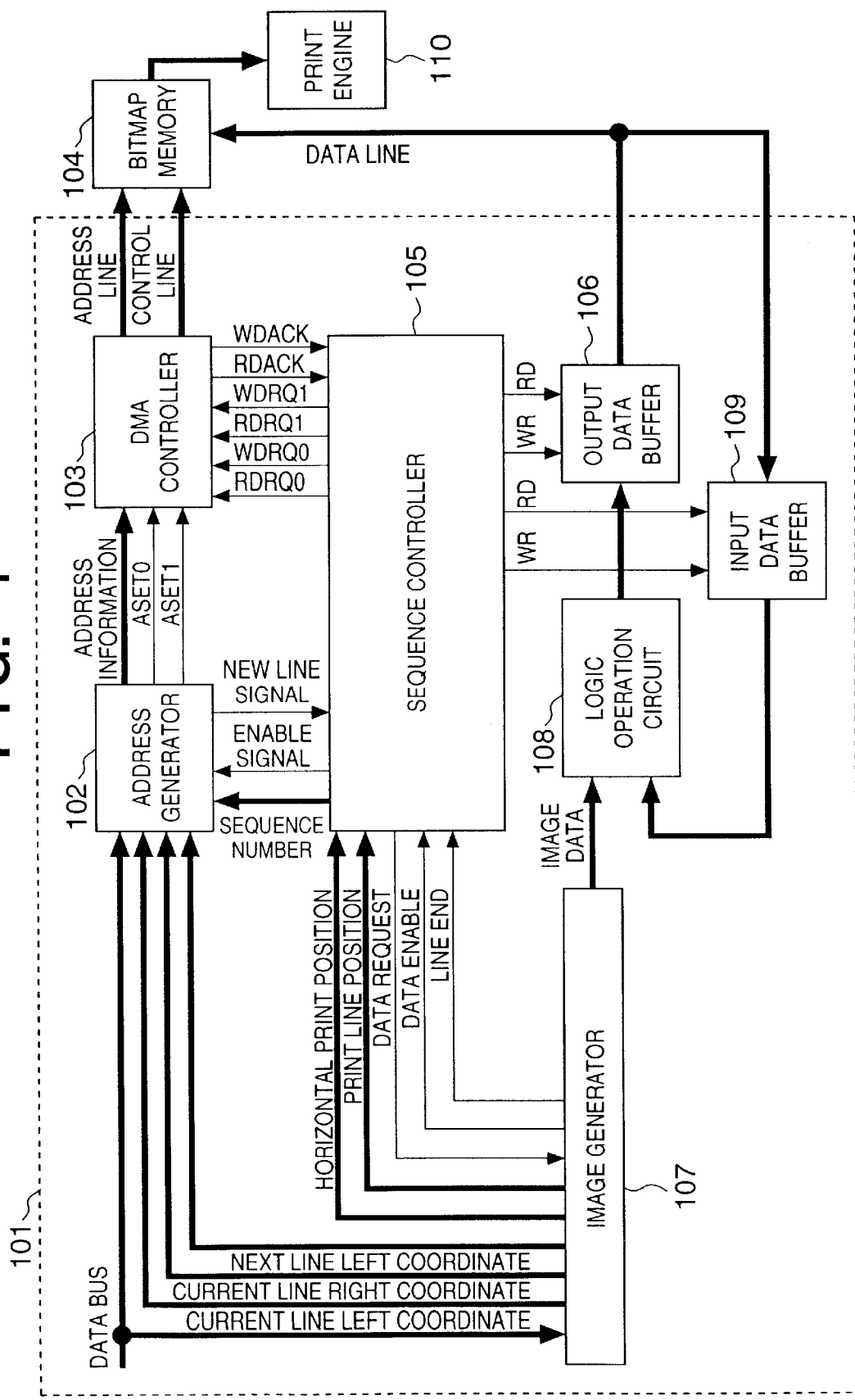
FIG. 1 is a block diagram showing the arrangement of a rendering apparatus according to the first embodiment of the present invention.

FIG. 1 is a block diagram showing the arrangement of a rendering apparatus according to an embodiment of the present invention. Referring to FIG. 1, reference numeral 101 denotes a rendering apparatus; 102, an address generator; and 103, a DMA controller. Reference numeral 104 denotes a bitmap memory connected to the rendering apparatus; 105, a sequence controller; 106, an output data buffer; 107, an image generator; 108, a logic operation circuit; and 109, an input data buffer. Reference numeral 110 denotes a print engine. The present invention can also be applied to a CRT or liquid crystal display in place of the print engine.

Figure 2:
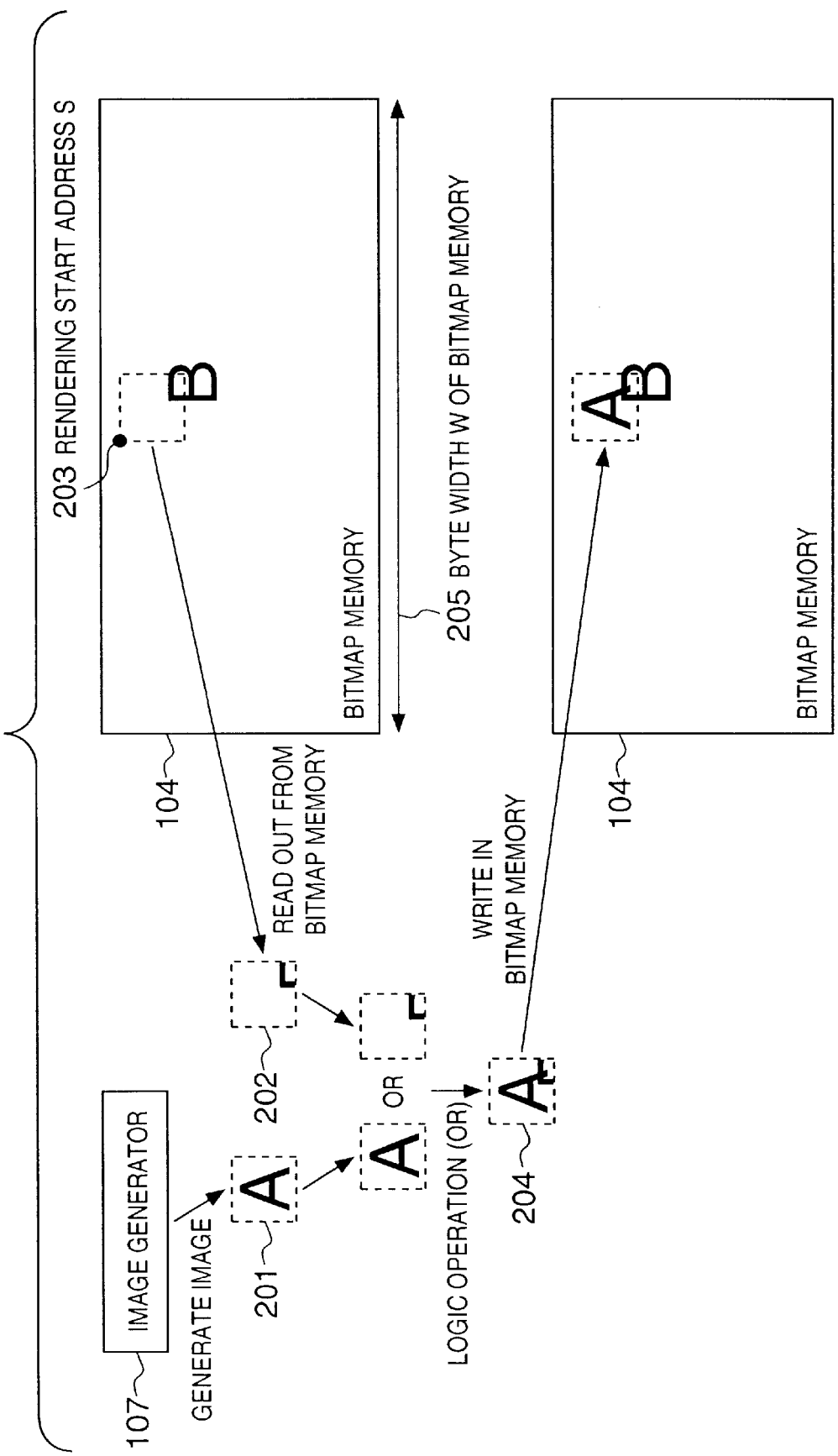
FIG. 2 is a view for explaining the rendering process of the rendering apparatus according to the first embodiment of the present invention.

FIG. 2 is a view for explaining the rendering process of the rendering apparatus according to the embodiment of the present invention. Reference numeral 201 denotes a source image generated by the image generator 107 shown in FIG. 1; and 202, data in an area to be rendered, that includes an image which has already been read out from the bitmap memory and rendered previously. Reference numeral 203 denotes a rendering start address S on the bitmap memory, where rendering is to start; 204, image data after logic operations; and 205, a byte width W of the bitmap memory.

Figure 3:
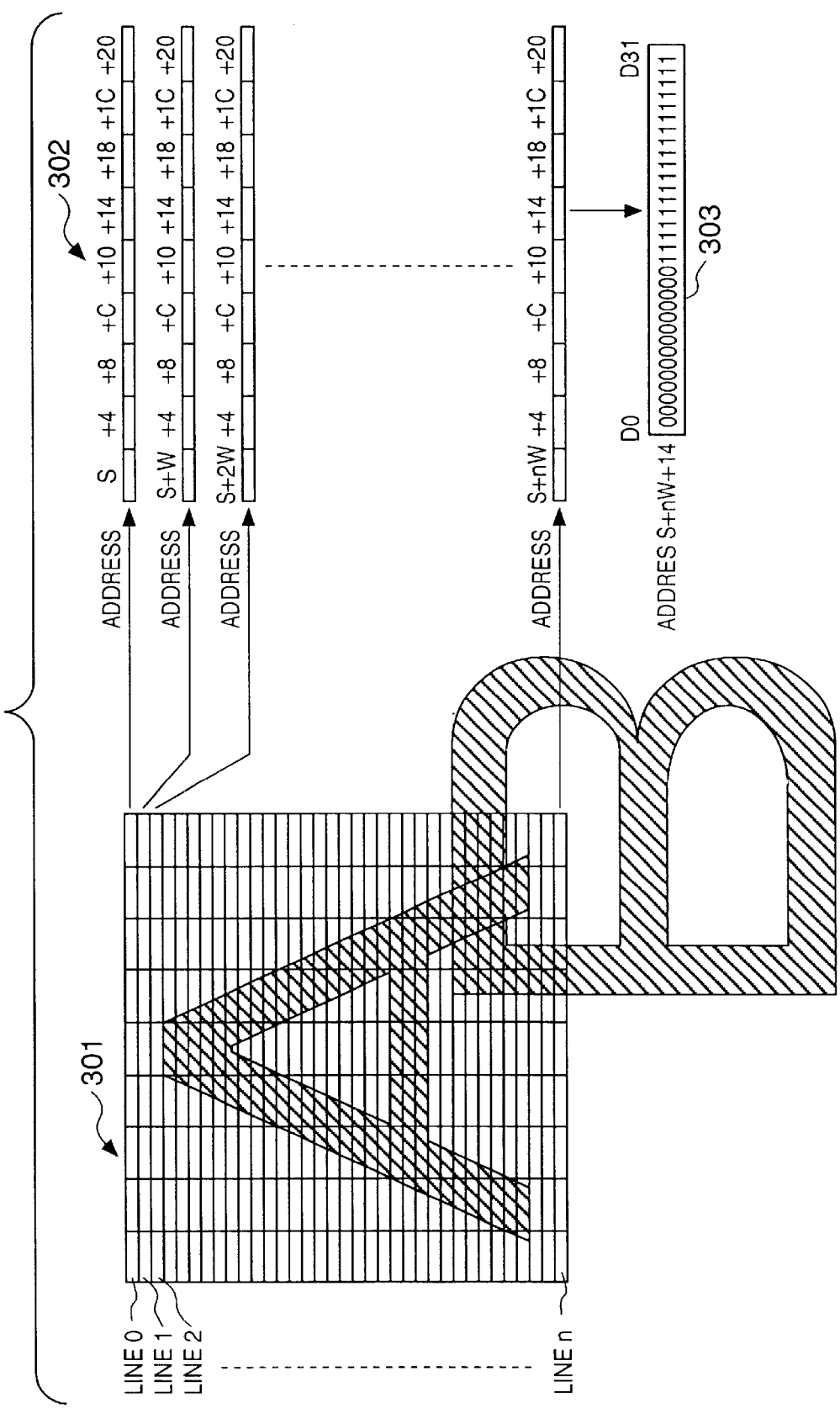
FIG. 3 is a view for explaining the format of a bitmap memory.

FIG. 3 shows the format of the bitmap memory, and explains the correspondence between image data and rendering addresses taking as an example rendering of a rectangular area. Referring to FIG. 3, reference numeral 301 denotes a rectangle image rendered on the bitmap memory; 302, addresses of the image on the bitmap memory; and 303, an expression method of the image in that memory.

Figure 4:
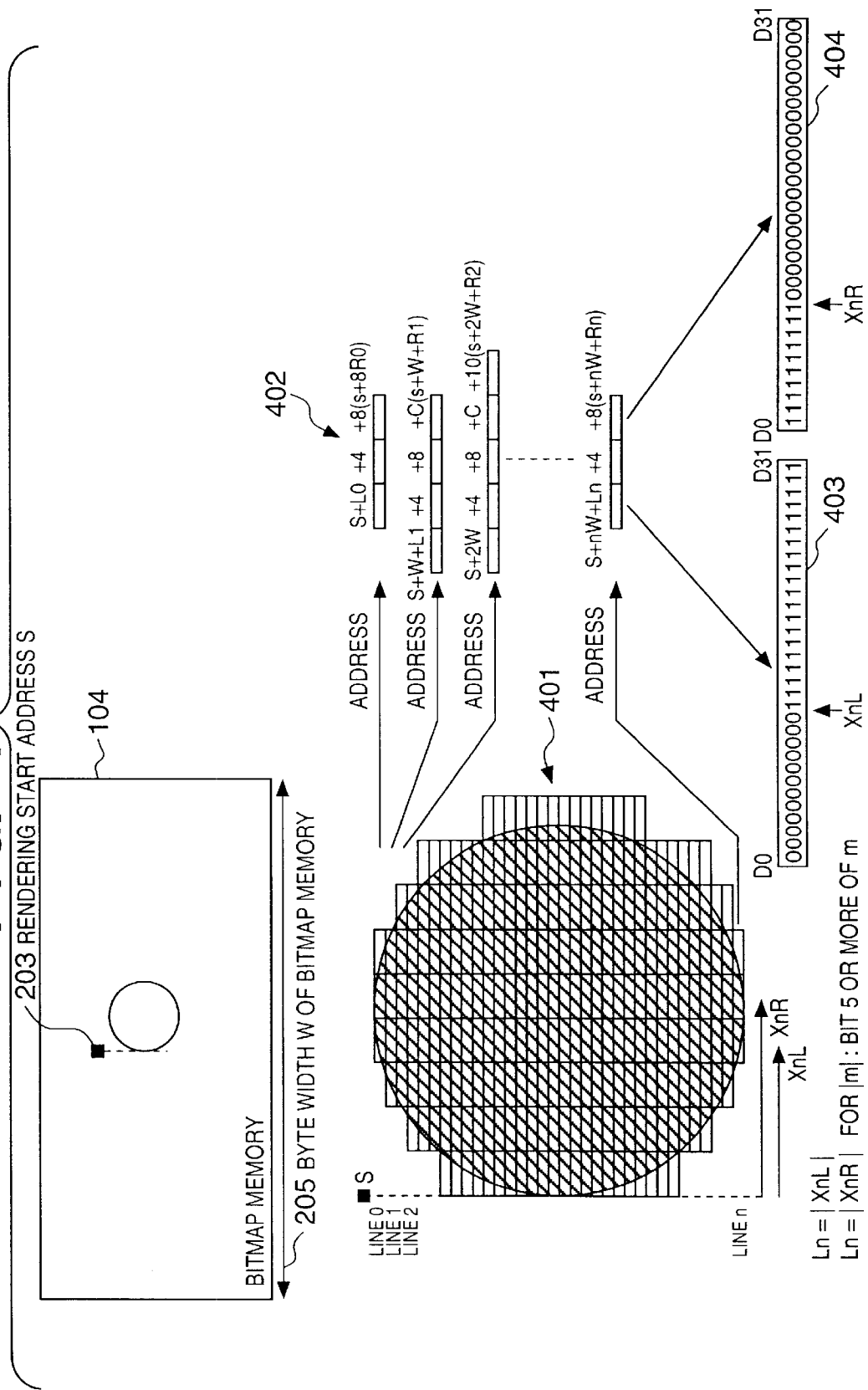
FIG. 4 is a view for explaining a rendering process of an object other than a rectangle.

FIG. 4 is a view for explaining the correspondence between image data and rendering addresses upon rendering an object other than a rectangle. Reference numeral 401 denotes an image of a circle rendered on the bitmap memory 104; 402, addresses of the circle image on the bitmap memory; and 403 and 404, expression methods of the image in the memory.

Figure 5:
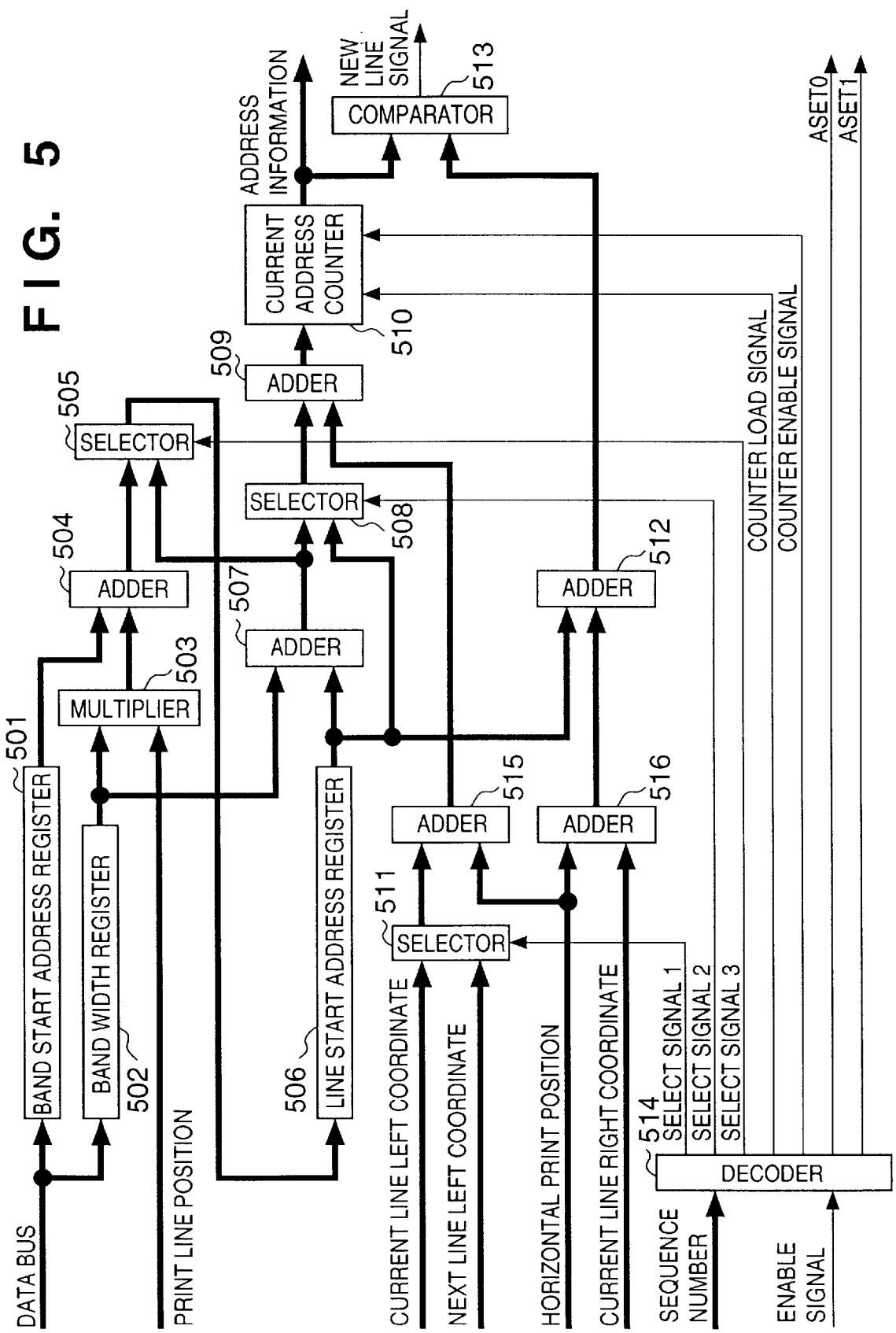
FIG. 5 is a block diagram for explaining the arrangement of an address generator.

FIG. 5 shows the arrangement of the address generator 102 in FIG. 1. Reference numeral 501 denotes a band start address register for holding the start address of a rendering band on the bitmap memory; 502, a band width register for holding the number of words of the width of the rendering band; 503, a multiplier; and 504, an adder. Reference numeral 505 denotes a selector; 506, a line start address register for holding the start address of a rendering current line; 507, an adder; 508, a selector; 509, an adder; 510, a current address counter for generating the current address of rendering; 511, a selector; 512, an adder; 513, a comparator; 514, a decoder; and 515 and 516, adders.

Figure 6:
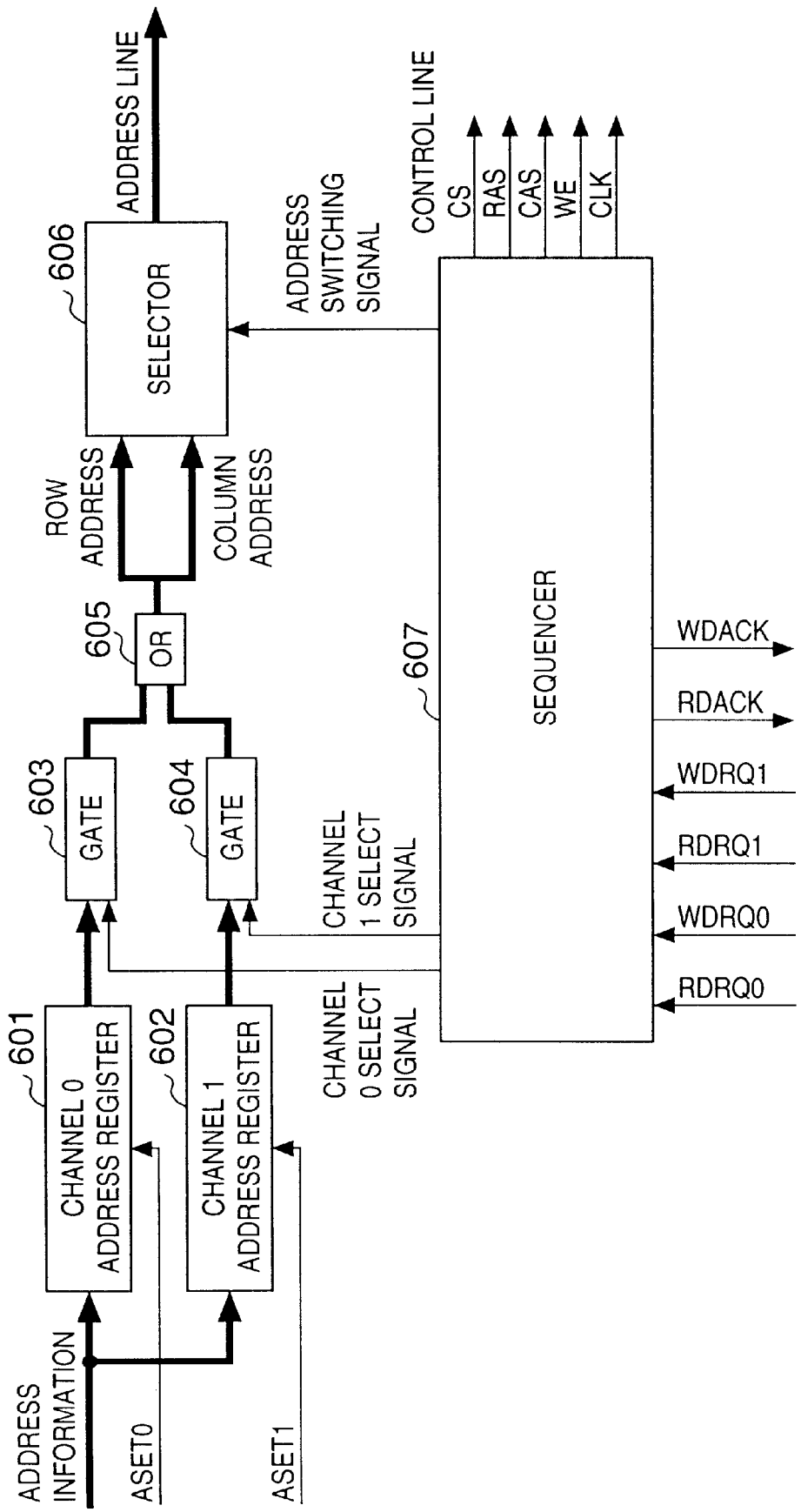
FIG. 6 is a block diagram for explaining the arrangement of a DMA controller.

FIG. 6 shows the internal arrangement of the DMA controller 103 in FIG. 1. Reference numeral 601 denotes a channel 0 address register for holding the address of DMA channel 0; 602, a channel 1 address register for holding the address of DMA channel 1; 603 and 604, logic gates; 605, an OR logic; 606, a selector for selecting the row and column addresses, and outputting the selected addresses; and 607, a sequencer for controlling the aforementioned components.

Figure 7:
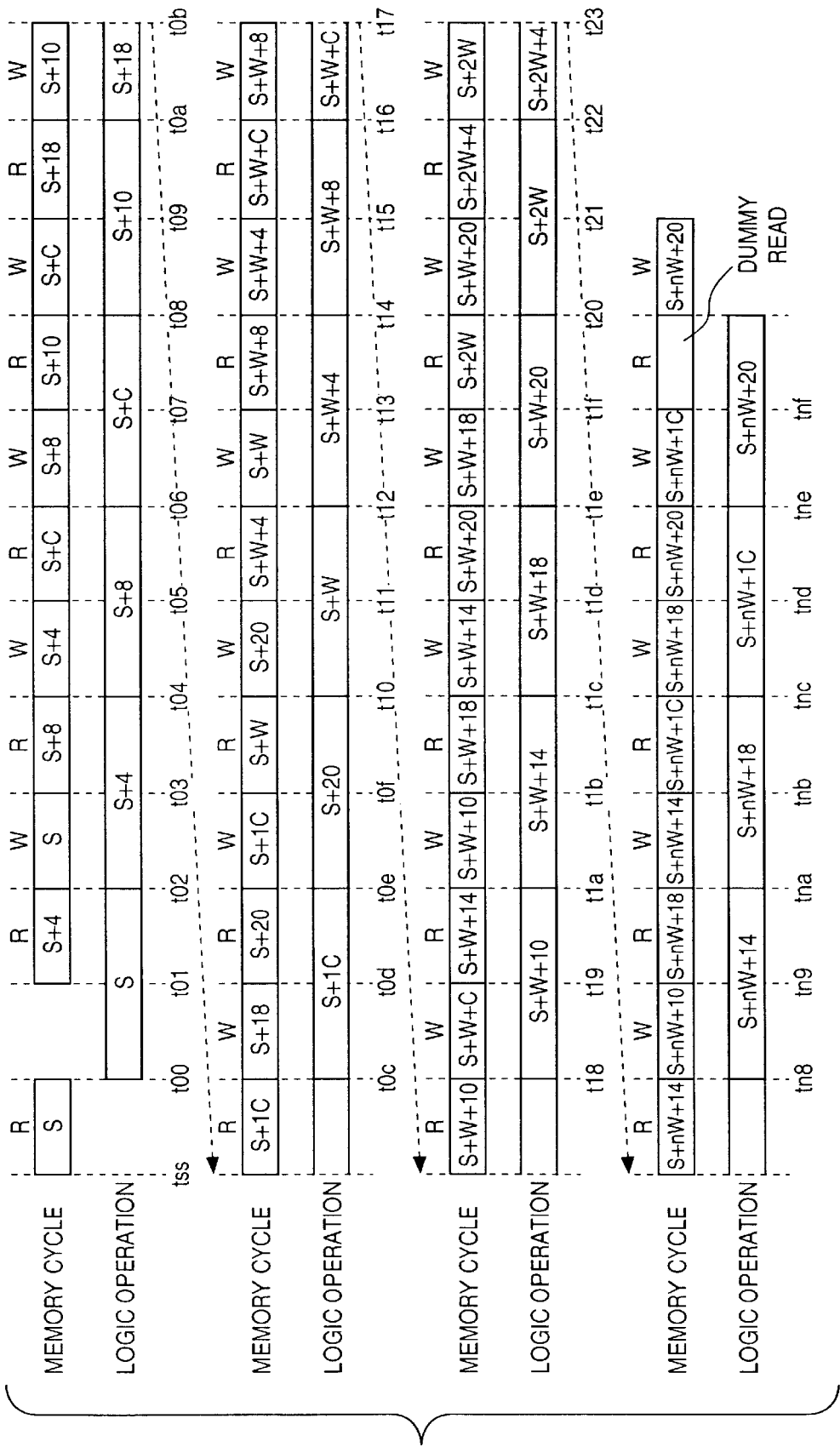
FIG. 7 is a chart for explaining the memory cycle in, rectangle rendering.

FIG. 7 shows the memory cycle of the bitmap memory and logic operation timings upon rendering rectangle data shown in FIG. 3. Referring to FIG. 7, the upper boxes indicate memory cycles, and the letters in the boxes indicate access addresses of the memory cycles, which addresses correspond to the addresses 302 in FIG. 3.

Letters R and W above the box indicate if the accesses to the addresses are read or write access. Furthermore, the lower boxes indicate timings at which logic operations are made, and the letters in the boxes indicate addresses where the operated data are rendered. The lowermost symbols indicate the phase change timings of the memory cycles and logic operations.

Rendering of a rectangle image by the rendering apparatus according to the present invention will be explained first using FIGS. 1 to 3 and 5 to 7, and rendering of an image other than a rectangle image will then be explained using FIGS. 1, 2, 4 to 6, and 8.

Upon rendering an image using the rendering apparatus according to the embodiment of the present invention, required parameters are set in the address generator 102 in FIG. 1 via a data bus so as to control the addresses of the bitmap memory 104 in FIG. 1 as a rendering target memory.

The band start address register 501 in FIG. 5 holds the start address of a rendering band driven on the data bus at a predetermined timing. Subsequently, the band width register 502 holds the value of the band width of the band driven on the data bus.

The parameters need only be set in the address generator 102 once before rendering for one band starts, when rendering is done in units of rendering bands. Rendering for one band normally includes some rendering units such as a plurality of characters, a figure, an image, and the like, and the present invention repeats operations to be described below for each of these rendering units to attain image formation for one band. Rendering data for one band is given in the form of so-called display lists each of which stores, for each rendering unit, a rendering position in a band, and an attribute and storage position of rendering object data of a source image of the rendering unit, i.e., a character font, compressed character font, image data, compressed image data, code data obtained by encoding the edge of, e.g., a figure, and the like. The rendering data as these display lists are formed by a processing means such as a CPU or the like (not shown) on a memory (not shown), and are input to the image generator 107 in FIG. 1 via the data bus at a predetermined timing.

Since the format of the display list, its formation method, the input method to the image generator 107, and the like are repetitively disclosed in various situations as the state-of-the-art means, a detailed description thereof will be omitted.

The image generator 107 in FIG. 1 reads display lists via the data bus, and starts rendering in accordance with their contents. The image generator 107 then reads object data designated by a given display list, and generates an image. For example, when object data of an image to be generated is a compressed font, the image generator 107 reads compressed object data from the data bus, and outputs image data expanded to bitmap data. The output image data is rectangle data like 201 in FIG. 2, and undergoes a logic operation with data in a rectangular area to be rendered from the start address S 203.

The image generator 107 in FIG. 1 outputs, to the address generator 102 in FIG. 1, a print line position, i.e., the value of a line position of an image to be rendered on the bitmap memory, which is designated by the display list, a horizontal print position, i.e., the coordinate of a rendering reference point from the left end of a print area, a current line left coordinate, i.e., the coordinate of the start position of an image in the line to be processed from the rendering reference point, a current line right coordinate, i.e., the coordinate of the end position of the image in the line to be processed from the rendering reference point, and a next line left coordinate, i.e., the coordinate of the start position of an image in a line next to the line to be processed from the rendering reference point, at the same time when it outputs the generated image.

When the rendering operation has started, the sequence controller 105 in FIG. 1 is activated, and outputs a sequence number for address generation and an enable signal to the address generator 102 in FIG. 1. Upon receiving these signals, the address generator 102 in FIG. 1 computes the start address of the rendering line. The band address register 501 in FIG. 5 holds the start address of a rendering band, and the band width register 502 is set with the rendering band width, as described above. The address generator multiplies the value in the band width register 502 and the value of the input print line position by the multiplier 503, adds the product to the value in the band start address register 501 to generate the start address of the rendering line, and stores that address in the line start address register 506.

The sequence controller 105 in FIG. 1 then outputs a sequence number the rendering start address yields, and an enable signal. In response to these signals, the address generator 102 adds the coordinate of the input horizontal print position and the current line left coordinate by the adder 515 in FIG. 5, and adds the sum and the value in the line start address register 506 by the adder 509, thus obtaining the rendering start address S, i.e., 201 in FIG. 2. When an image to be rendered is a rectangle, since the values of the current line left coordinate and next line left coordinate are zero, the rendering start address S is given by the sum of the value of the line start address register and the horizontal print position coordinate. The current line right coordinate value indicates the coordinate of the line last word from the rendering reference point. In this case, this value is constant, and is 20$h$ in the example shown in FIG. 2. At this time, a counter load signal shown in FIG. 5 output, and the address S is loaded to the current address counter 510 as an initial value. With the aforementioned operations, initial setups required for starting rendering are complete, and the rendering apparatus starts actual rendering operation. Details of an image rendered by the rendering operation shown in FIG. 2 are expressed by 301 in FIG. 3, and the image is rendered on memory cells which are arranged in correspondence with the width of the image in units of rendering lines, as indicated by 302.

Line 0 to line n are processed in units of words as in FIG. 2. That is, data at the address S is read out from the bitmap memory 104 in FIG. 1 and is ORed with corresponding image data output from the image generator 107, and the OR is written at the same address on the bitmap memory. This rendering operation in units of words repeats itself in successive words by designating addresses S, S+4, S+8, ..., S+20, and a new line starts there. Then, the rendering operation similarly repeats itself by designating addresses S+W, S+W+4, ..., of the next line until the last data of line n. Each word data expresses an image by assigning bit data 1 and 0 to black and white dots at corresponding positions of the image, as indicated by 303 in FIG. 3.

According to the present invention, the rendering operation is characterized by simultaneously executing a logic operation process for logically operating image data output from the image generator 107 in FIG. 1 with corresponding data read from the bitmap memory onto the input data buffer 109 in advance, and writing the operation result in the output data buffer 106, and a memory access process for loading the next data to be logically operated from the bitmap memory 104 onto the input data buffer 109, or writing data from the output data buffer 106 on the bitmap memory 104.

FIG. 7 time-serially expresses these two processes, a row of memory cycles corresponds to the memory access process, and a column of logic operations corresponds to the logic operation process. As described above, upon completion of initial setups, the current address counter 510 in FIG. 5 has loaded the rendering start address S. This state corresponds to time tss in FIG. 7. The value of the current address counter is output as address information to the DMA controller 103 in FIG. 1. In this state, the address generator 102 outputs an address set signal ASET0 to the DMA controller 103, and the rendering start address S is held in the channel 0 address register 601 in FIG. 6. Subsequently, the sequence controller 105 outputs a signal RDRQ0 to the DMA controller 103 to activate a memory read cycle.

Upon receiving RDRQ0, the DMA controller shown in FIG. 6 outputs a channel 0 select signal to enable the gate 603, thus outputting the channel 0 select signal to the selector 606 via the OR logic 605. The sequencer 607 switches an address switching signal at predetermined timings to drive the row and column addresses onto the address line, and produces a memory read, cycle using a control line.

At this time, a signal WR is output to the data input buffer 109 at a predetermined timing. The bitmap memory 104 in FIG. 1 drives memory data onto a data line based on the data on the address line and control line, and writes that data in the input data buffer 109 in response to the signal WR. The memory cycle of address S is completed at time t00. At time t00, the adder 512 in FIG. 5 adds the value of the line start address register 506 and the input current line right coordinate to compute the last rendering address of the current line. The comparator 513 compares this value with the value of the current address counter 510. If the two values match, the comparator 513 outputs a new line signal. If no new line signal is output, the sequence controller 105 in FIG. 1 outputs a sequence number of address increment, and an enable signal.

At this time, the decoder 514 in FIG. 5 outputs a count enable signal to the current address counter 510 to increment the contents of the current address counter to indicate the next memory address. When the updated address information is output to the DMA controller 103 in FIG. 1, the decoder 514 outputs a signal ASET1 to the DMA controller 103, and the address information is held in the channel 1 address register 602 in FIG. 6.

After that, the sequence controller 105 in FIG. 1 outputs a signal RDRQ1 to the DMA controller 103 to produce a memory read cycle of channel 1. Details of this memory cycle are the same as those for the read cycle of channel 0 mentioned above. With this operation, data at address S+4 is read out from the bitmap memory 104, and is written in the input data buffer 109 in response to the signal WR. At the time of completion of this read, if no new line signal in FIG. 5 output, the current address counter 510 is counted up to change address from S+4 to S+8. Then, the comparator 513 compares the value S+8 of the current address counter with the line end address, i.e., the sum of the value of the line start address register 506 and the current line right coordinate value, which is computed by the adder 512, and if the two values match, the comparator 513 outputs a new line signal. In this case, since the current address is S+8 and the line end address is S+20, no new line signal is output.

At the same time, at timing t00, the data at address S, which has been held in the input data buffer 109 in FIG. 1 previously, and image data output from the image generator 107 are logically operated by the logic operation circuit 108, and the operation result is output to the output data buffer 106. The image generator outputs a data enable signal to the sequence controller 105 at a timing at which the image is ready to be output, and the sequence controller outputs a data request to the image generator at a timing at which a logic operation can be done, i.e., at t00 in this case. The time when both these two signals are generated corresponds to the write timing in the output data buffer 106. At that time, the sequence controller 105, outputs a signal WR to the output data buffer 106, and writes the logically operated data at address S. Both this write and the read of data at address S4 are complete at timing t02.

At timing t02, the input data buffer 109 in FIG. 1 holds the logically operated data at address S, and the output data buffer 106 holds data at address S+4 read out from the bitmap memory. Also, the channel 0 address register 601 in FIG. 6 holds address S, and the channel 1 address register 602 holds address S+4. At timing t02, the sequence controller 105 in FIG. 1 outputs a signal WDRQ0 to the DMA controller 103 to start a write to the bitmap memory 104. In this write, the value of the channel 0 address register 601 in FIG. 6 is selected and is driven onto the address line, and a signal for producing a write cycle is driven onto thee control line as in the aforementioned read. Simultaneously with the memory cycle, the sequence controller 105 in FIG. 1 outputs a signal RD to the output data buffer 106. In response to the signal RD, the output data buffer drives the logically operated data at address S held therein onto the data line, and this data is written at address S of the bitmap memory 104. This write is complete at timing t03.

At timing t03, the address generator 102 in FIG. 1 outputs a signal ASET0 to write the value S+8 of the current address counter 510 in FIG. 5 in the channel 0 address register 601 in FIG. 6 as address information. Also, the sequence controller 105 outputs a signal RDRQ0 to execute a similar read memory cycle to store data at address S+8 in the input data buffer 109. After that, the current address counter 510 in FIG. 5 counted up as in the above operation.

While the read and write cycles from and to the bitmap memory are executed at timings t02 and t03, the logic operation circuit 108 operates data at address S+4 held in the input data buffer 109 and image data output from the image generator 107, and the operation result is written in the output data buffer 106. This write and the read of data from the bitmap memory that has started at timing t03 are both complete at timing t04.

The same process is repeated while alternately switching the DMA address of the bitmap memory to the values held in the channel 0 and 1 address registers 601 and 602.

<New Line Process>

A process upon completion of rendering for one line and executing new line operation will be explained below. Upon completion of the read of data at address S+20 at timing t0d, as shown in FIG. 7, the comparator 513 in FIG. 5 outputs a new line signal. This new line signal makes the sequence controller 105 output a sequence number indicating a new line process and an enable signal. In response to these signals, the decoder 514 in FIG. 5 controls select signals 1, 2, and 3 to write back data obtained by adding the value of the line start address register 506 and the value of the, band width register 502 by the adder 507 to the line start address register 506, thus updating the line start address to the start address of the next line. At the same time, the adder 509 adds the sum of the value of the horizontal print position and the value of the next line left coordinate to the updated line start address, and rendering start address S+W of that line is loaded to the current address counter 510 in response to a counter load signal. As described above, upon rendering a rectangle image, since the value of the next line left coordinate is zero, rendering start address S+W is given by the sum of the line start address and the horizontal print position. The load operation and the logic operation of data at address S+1C are both complete at timing t0e.

At timing t0e, a write from the output data buffer 106 in FIG. 1 to the bitmap memory is made based on address S+1C in the channel 0 address register 601 in FIG. 6. This write is complete at timing t0f.

At timing t0f, the value S+W in the current address counter 510 in FIG. 5 is written in channel 0 address register 601 in FIG. 6 in response to a signal ASET0, and data at address S+W is read out from the bitmap memory and is held in the input data buffer as in the aforementioned operation.

Upon completion of this read, the current address counter 510 in FIG. 5 is updated to S+W+4.

Simultaneously with the aforementioned operation, data at address S+20 is logically operated and stored in the output buffer at timings t0e and t0f. At this time, the image generator 107 in FIG. 1 generates a line end signal to the sequence controller 105 to execute new line, operation that updates the current line left coordinate, next line left coordinate, and current line right coordinate to those of the next line, i.e., data of the line from address S+W to S+W+20.

At this time, the sequence controller switches the selector 511 to output the current line left coordinate using a sequence number and enable signal.

All the aforementioned operations are complete at timing t10. After timing t10, operations with and without a new line process are repeated, thus rendering a rectangle image. As shown in FIG. 7, the last data of the last line is data at address S+nW+20, and upon completion of the logic operation of this data, the image generator 107 completes its operation. The address generator 102, DMA controller 103, and sequence controller 105 in FIG. 1 complete their operations after they write data at address S+nW+20 in the bitmap memory.

<Rendering of Image Other Than Rectangle>

The rendering operation of an image other than a rectangle image will be explained below. The image generator 107 in FIG. 1 loads the display lists via the data bus, and starts rendering in accordance with the contents of the display lists. The image generator reads object data designated by a given display list, and generates an image. For example, when object data of an image to be generated is compressed graphic data of, e.g., a circle, the image generator reads compressed object data from the data bus, and outputs image data expanded to bitmap data. The output image data is circle data, as shown in FIG. 4, and is logically operated with data in a circular area to be rendered from the start address S 203. The image generator 107 in FIG. 1 outputs, to the address generator 102 in FIG. 1, a print line position, i.e., the value of a line position of an image to be rendered on the bitmap memory, which is designated by the display list, a current line left coordinate, i.e., the coordinate of the start position of an image in the line to be processed from the rendering reference point, a current line right coordinate, i.e., the coordinate of the end position of the image in the line to be processed from the rendering reference point, and a next line left coordinate, i.e., the coordinate of the start position of an image in a line next to the line to be processed from the rendering reference point, at the same time when it outputs the generated image.

When the rendering operation has started, the sequence controller 105 in FIG. 1 is activated, and outputs a sequence number for performing address generation and an enable signal to the address generator 102 in FIG. 1. Upon receiving these signals, the address generator 102 in FIG. 1 computes the start address of the rendering line. The band address register 501 in FIG. 5 holds the start address of a rendering band, and the band width register 502 is set with the rendering band width, as described above. The address generator multiplies the value in the band width register 502 and the value of the input print line position by the multiplier 503, adds the product to the value in the band start address register 501 to generate the start address of the rendering line, and stores that address in the line start address register 506. The sequence controller 105 in FIG. 1 then outputs a sequence number the rendering start address yields, and an enable signal. In response to these signals, the address generator 102 adds the coordinate of the input horizontal print position and the current line left coordinate by the adder 515 in FIG. 5, and adds the sum and the value in the line start address register 506 by the adder 509, thus obtaining the rendering start address S+L0, i.e., 201 in FIG. 2.

When an image to be rendered is not a rectangle, since the values of the current line left coordinate and next line left coordinate respectively indicate the start coordinates of corresponding line images, for example, L0, L1, . . . in case of the figure shown in FIG. 4, and the rendering start address S is given by the sum of the value of the line start address register, horizontal print position coordinate, and current line left coordinate. The current line right coordinate value indicates the coordinate of the line last word from the rendering reference point, and assumes unique values in units of lines (R0, R1 . . . in the example shown in FIG. 4). On the other hand, address S+L0 is loaded to the current address counter 510 as an initial value in response to a counter load signal in FIG. 5. With the aforementioned operations, initial setups required for starting rendering are complete, and the rendering apparatus starts actual rendering operation.

Details of the image to be rendered shown in FIG. 4 are expressed by 401 in FIG. 4, and the image is rendered on memory cells which are arranged in correspondence with the width of the image in units of rendering lines, as indicated by 402. Line 0 to line n are processed in units of words. That is, data at the address S+L0 is read out from the bitmap memory 104 in FIG. 1 and is ORed with corresponding image data output from the image generator 107, and the OR is written at the same address on the bitmap memory. This rendering operation in units of words repeats itself in successive words by designating addresses S+L0, S+L0+4, and S+L0+8, and a new line starts there. Then, the rendering operation similarly repeats itself by designating addresses S+W+L1, S+W+L1+4, . . . , of the next line until the last data of line n. Each word data expresses an image by assigning bit data 1 and 0 to black and white dots at corresponding positions of the image, as indicated by 403 and 404 in FIG. 4.

According to the present invention, the rendering operation is characterized by simultaneously executing a logic operation process for logically operating image data output from the image generator 107 in FIG. 1 with corresponding data read from the bitmap memory onto the input data buffer 109 in advance, and writing the operation result in the output data buffer 106, and a memory access process for loading the next data to be logically operated from the bitmap memory 104 onto the input data buffer 109, or writing data from the output data buffer 106 on the bitmap memory 104.

Figure 8:
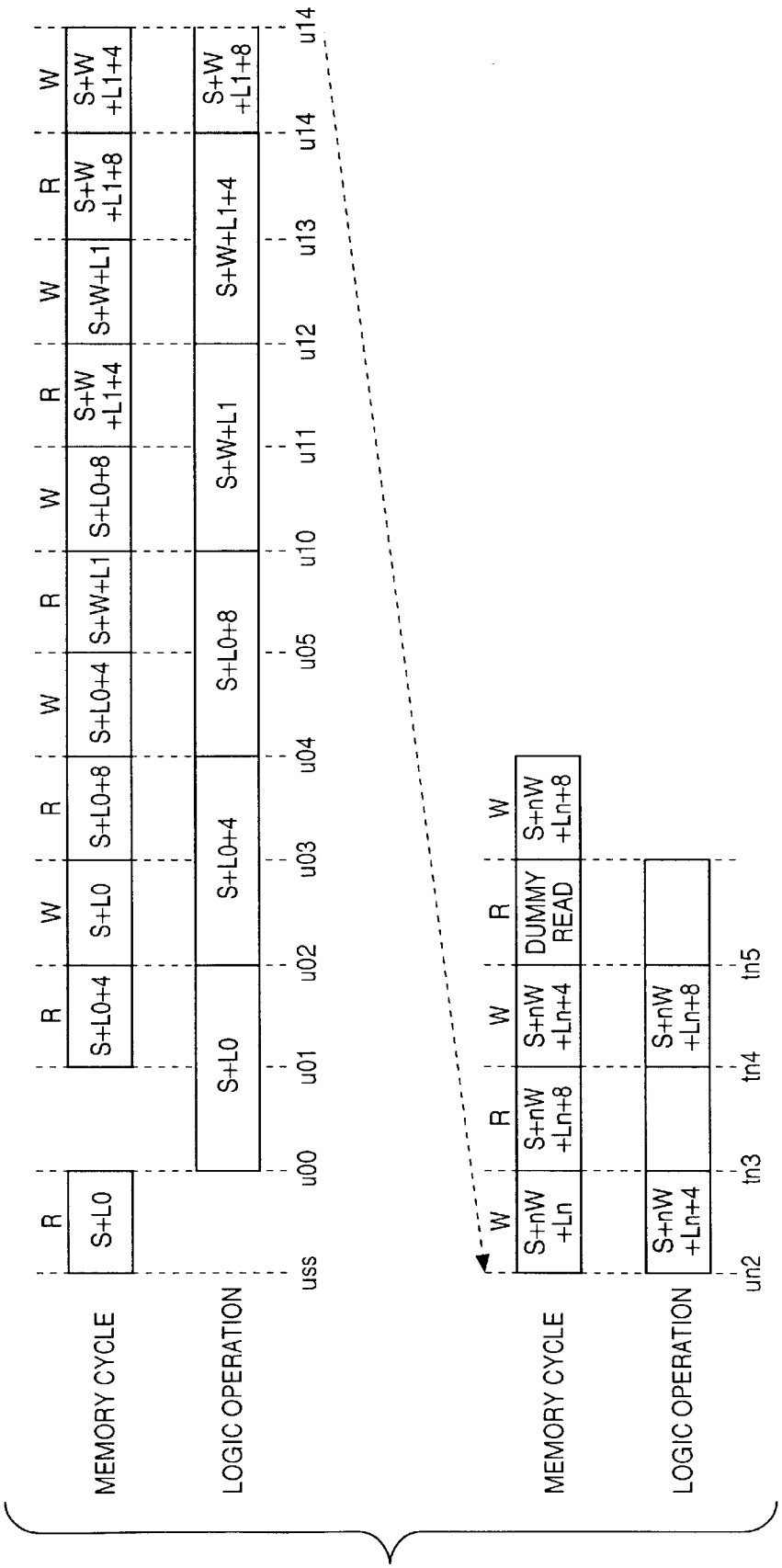
FIG. 8 is a chart for explaining the memory cycle upon rendering an object other than a rectangle.

FIG. 8 time-serially expresses these two processes, a row of memory cycles corresponds to the memory access process, and a column of logic operations corresponds to the logic operation process as in FIG. 7. As described above, upon completion of initial setups, the current address counter 510 in FIG. 5 has loaded the rendering start address S+L0. This state corresponds to time uss in FIG. 8. The value of the current address counter is output as address information to the DMA controller 103 in FIG. 1. In this state, the address generator 102 outputs an address set signal ASET0 to the DMA controller 103, and the rendering start address S+L0 is held in the channel 0 address register 601 in FIG. 6.

Subsequently, the sequence controller 105 outputs a signal RDRQ0 to the DMA controller 103 to activate a memory read cycle. Upon receiving RDRQ0, the DMA controller shown in FIG. 6 outputs a channel 0 select signal to enable the gate 603, thus outputting the channel 0 select signal to the selector 606 via the OR logic 605. The sequencer 607 switches an address switching signal at predetermined timings to drive the row and column addresses onto the address line, and produces a memory read cycle using a control line. At this time, a signal WR is output to the data input buffer 109 at a predetermined timing. The bitmap memory 104 in FIG. 1 drives memory data onto a data line based on the data on the address line and control line, and writes that data in the input data buffer 109 in response to the signal WR. The memory cycle of address S+L0 is complete at time t00.

At time u00, the adder 512 in FIG. 5 adds the value of the line start address register 506 and the input current line right coordinate to compute the last rendering address of the current line. The comparator 513 compares this value with the value of the current address counter 510. If the two values match, the comparator 513 outputs a new line signal. If no new line signal is output, the sequence controller 105 in FIG. 1 outputs a sequence number of address increment, and an enable signal. At this time, the decoder 514 in FIG. 5 outputs a count enable signal to the current address counter 510 to increment the contents of the current address counter to indicate the next memory address. When the updated address information is output to the DMA controller 103 in FIG. 1, the decoder 514 outputs a signal ASET1 to the DMA controller 103, and the address information is held in the channel 1 address register 602 in FIG. 6. After that, the sequence controller 105 in FIG. 1 outputs a signal RDRQ1 to the DMA controller 103 to produce a memory read cycle of channel 1. Details of this memory cycle are the same as those for the read cycle of channel 0 mentioned above. With this operation, data at address S+L0+4 is read out from the bitmap memory 104, and is written in the input data buffer 109 in response to the signal WR. At the time of completion of this read, if no new line signal in FIG. 5 is output, the current address counter 510 is counted up to change address from S+L0+4 to S+L0+8. Then, the comparator 513 compares the value S+L0+8 of the current address counter with the line end address, i.e., the sum of the value of the line start address register 506 and the current line right coordinate value, which is computed by the adder 512, and if the two values match, the comparator 513 outputs a new line signal.

In this example, since S+L0+8 equals S+R0, as indicated by 402 in FIG. 4, a new line signal is output. At the same time, at timing u00, the data at address S+L0, which has been held in the input data buffer 109 in FIG. 1 previously, and image data output from the image generator 107 are logically operated by the logic operation circuit 108, and the operation result is output to the output data buffer 106.

The image generator outputs a data enable signal to the sequence controller 105 at a timing at which the image is ready to be output, and the sequence controller 105 outputs a data request to the image generator at a timing at which a logic operation can be done, i.e., at u00 in this case. The time when both these two signals are generated corresponds to the write timing in the output data buffer 106. At that time, the sequence controller 105 outputs a signal WR to the output data buffer 106, and writes the logically operated data at address S+L0. Both this write and the read of data at address S4 are complete at timing u02.

At timing u02, the input data buffer 109 in FIG. 1 holds the logically operated data at address S+L0, and the output data buffer 106 holds data at address S+L0+4 read out from the bitmap memory. Also, the channel 0 address register 601 in FIG. 6 holds address S+L0, and the channel 1 address register 602 holds address S+L0+4. At timing u02, the sequence controller 105 in FIG. 1 outputs a signal WDRQ0 to the DMA controller 103 to start a write to the bitmap memory 104. In this write, the value of the channel 0 address register 601 in FIG. 6 is selected and is driven onto the address line, and a signal for producing a write cycle is driven onto the control line as in the aforementioned read. Simultaneously with the memory cycle, the sequence controller 105 in FIG. 1 outputs a signal RD to the output data buffer 106. In response to the signal RD, the output data buffer drives the logically operated data at address S+L0 held therein onto the data line, and this data is written at address S+L0 of the bitmap memory 104.

This write is complete at timing u03. At timing u03, the address generator 102 in FIG. 1 outputs a signal ASET0 to write the value S+L0+8 of the current address counter 510 in FIG. 5 in the channel 0 address register 601 in FIG. 6 as address information. After that, the sequence controller 105 outputs a signal RDRQ0 to execute a similar read memory cycle to store data at address S+L0+8 in the input data buffer 109.

Upon completion of the read of data at address S+L0+8 at timing u03, as shown in FIG. 8, the comparator 513 in FIG. 5 outputs a new line signal. This new line signal makes the sequence controller 105 output a sequence number indicating a new line process and an enable signal. In response to these signals, the decoder 514 in FIG. 5 controls select signals 1, 2, and 3 to write back data obtained by adding the value of the line start address register 506 and the value of the band width register 502 by the adder 507 to the line start address register 506, thus updating the line start address to the start address of the next line.

At the same time, the adder 509 adds the sum of the value of the horizontal print position, the value of the next line left coordinate, and the updated line start address, and rendering start address S+W+L1 of that line is loaded to the current address counter 510 in response to a counter load signal.

The load operation and the logic operation of data at address S+L0+4 are both complete at timing u04. At timing u04, a write from the output data buffer 106 in FIG. 1 to the bitmap memory is made based on address S+L0+4 in the channel 1 address register 602 in FIG. 6. This write is complete at timing u05.

At timing u05, the value S+W+L1 of the current address counter 510 in FIG. 5 is written in the channel 1 address register 602 in FIG. 6 in response to a signal ASET0, and data at address S+W+L1 is read out from the bitmap memory and is held in the input data buffer as in the aforementioned operation.

Upon completion of this read, the current address counter 510 in FIG. 5 is updated to S+W+L1+4. Simultaneously with the aforementioned operation, data at address S+L0+8 is logically operated and stored in the output buffer at timings u04 and u05. At this time, the image generator 107 in FIG. 1 generates a line end signal to the sequence controller 105 to execute new line operation that updates the current line left coordinate, next line left coordinate, and current line right coordinate to those of the next line, i.e., data of the line from address S+W+L1 to S+W+L1+C. At this time, the sequence controller switches the selector 511 to output the current line left coordinate using a sequence number and enable signal.

All the aforementioned operations are completed at timing u10. After timing u10, operations with and without a new line process are repeated, thus rendering an image other than a rectangle. As shown in FIG. 8, the last data of the last line is data at address S+nW+Ln+8 (Ln+8=Rn), and upon completion of the logic operation of this data, the image generator 107 completes its operation. The address generator 102, DMA controller 103, and sequence controller 105 in FIG. 1 complete their operations after they write data at address S+nW+Ln+8 in the bitmap memory.

As described above, according to the embodiment of the present invention, previously processed data is written on the bitmap memory during the logic operation of source image data and data in the bitmap memory, and the next data to be processed is also read out from the bit map memory, thus simultaneously executing the logic operation, and write and read of the bitmap memory parallel to each other.

Upon reading out the next data from the bitmap memory, if the currently logically operated data is the last data of the current line, data of the next line is read out, thus greatly improving the memory access efficiency, and achieving high-speed rendering.

Second Embodiment

Figure 9:
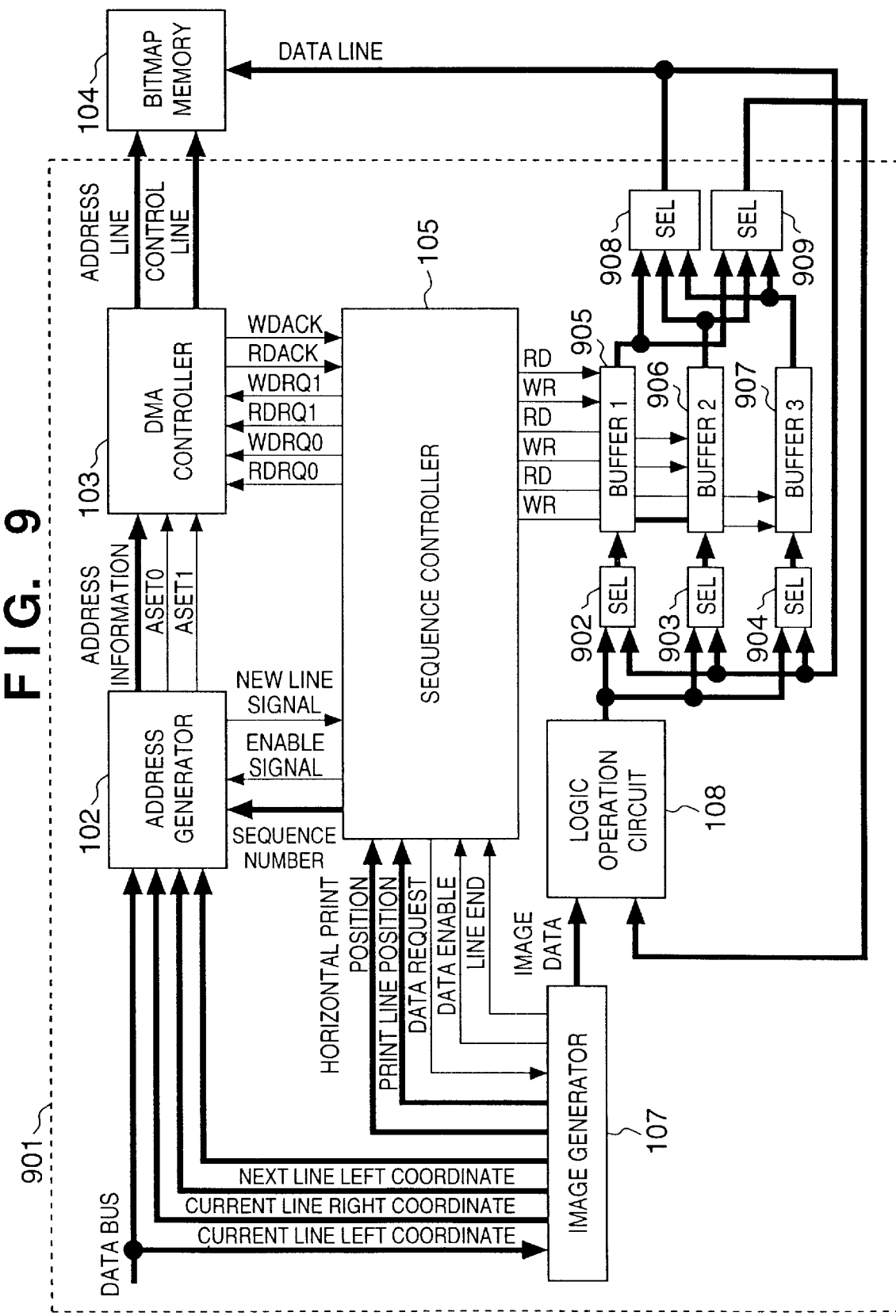
FIG. 9 is a block diagram for explaining the arrangement of a rendering apparatus according to the second embodiment of the present invention.

FIG. 9 shows the arrangement of a rendering apparatus according to the second embodiment of the present invention. Reference numeral 901 denotes a rendering apparatus; 902 and 903, selectors 905, buffer 1; 906, buffer 2; 907, buffer 3, and 908 and 909, selectors. Other components are the same as those in FIG. 1.

In this embodiment, the input and output data buffers of the first embodiment are constituted by the buffers 1 905 to 3 907. These three buffers are used by alternately switching their roles to an input buffer and output buffer.

For example, the operation of this embodiment will be described in detail taking FIG. 7 as an example. At timing 02, data at address S is read out from the buffer 1 905, and is written in a memory. At timing t03, since buffer 1 is empty, data read out from address S+8 is written in buffer 1. At the same time, data at address S+4 stored in the buffer 2 906 is read out and logically operated with image data, and the operation result is written in the buffer 3 907 at timings t02 and t03.

At timing t04, buffer 1 stores the data at address S+8 read from the memory, and buffer 3 stores the logically operated data at address S+4. Also, buffer 2 stores data which has already been used and is unnecessary. Therefore, the data at address S+4 is written from buffer 3 in the memory at timing t04, and data at address S+C is read and held in buffer 3, which becomes empty, at timing t05. At timings t04 and t05, simultaneously, data at address S+8 in buffer 1 is logically operated with image data, and the operation result is written in buffer 2. In this manner, the same effect as in the first embodiment can be obtained whet the three buffers are used by switching their roles in turn, and the input or output buffer size can be reduced.

Third Embodiment

In the first and second embodiments, memory access or a logic operation is done in units of words but may be done in units of a plurality of words. In this case, this embodiment can be implemented by increasing the size of the input buffer, output buffer, or buffers 1 to 3 in proportion to the number of words to be processed, and making addition of addresses and the like in correspondence with the number of words to be processed. Hence, the same effects as in the above embodiments can be obtained, and the rendering speed can be further improved.

Note that the present invention may be applied to either a system constituted by a plurality of devices (,e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the aforementioned processes of memory cycles (timing charts shown in FIGS. 7 and 8).

To recapitulate, according to the present invention, by synchronizing the logic operation of source image data and data in the bitmap memory, a write of the previously processed data in the bitmap memory, and a read of the next data to be processed, the logic operation, and write and read of the bitmap memory can be made parallel to each other, and the conventional problem can be solved, i.e., the logic operation process can be prevented from halting during the read or write of data from or to the bitmap memory, and access to the bitmap memory can be prevented from halting during execution of the logic operation process, thus achieving a high-speed rendering process.

As many apparently widely different embodiments of the present invention can be made without departing from the spirit and scope thereof, it is to be understood that the invention is not limited to the specific embodiments thereof except as defined in the claims.

What is claimed is:

1. A rendering apparatus for forming an image on a bitmap memory by logically operating a source image and data on the bitmap memory, comprising:

image generation means for generating the source image:

address generation means for generating read and write addresses of the bitmap memory;

DMA read means for directly reading out data from the bitmap memory in accordance with the generated address;

input data holding means for holding the data read from the bitmap memory;

logic operation means for making a logic operation on the basis of the read data and data of the source image;

output data holding means for holding the logically operated data; and

DMA write means for writing the data held in the bitmap memory in accordance with the generated address, wherein a data input process for writing data corresponding to an address generated at a first timing, a logic operation process for performing the logic operation of data corresponding to an address generated at a second timing, and an output process for reading out data corresponding to an address generated at a third timing, are processed parallel to each other, wherein the third timing is newer than the second timing; and wherein the first timing is older than the second timing.

2. A rendering apparatus for forming an image on a bitmap memory by logically operating a source image and data on the bitmap memory comprising:

image generating means for generating the source image;

address generation means for generating read and write addresses of the bitmap memory;

DMA read means for directly reading out data from the bitmap memory in accordance with the generated address;

input data holding means for holding the data read from the bitmap memory;

logic operation means for making a logic operation on the basis of the read data and data of the source image;

output data holding means for holding the logically operated data; and

DMA write means for writing the data held in the bitmap memory in accordance with the generated address, wherein said address generation means generates successive addresses when data that undergoes a logic operation process executed at the time of the next data input process is not last data of the current line, and generates an address of the next line when the data that undergoes the logic operation process is the last data of the current line.

3. The apparatus according to claim 1, further comprising a plurality of data holding means for holding input or output data, and wherein process latency due to data storage means which is not empty is removed by selectively using said plurality of data holding means as output or input data holding means.

4. The apparatus according to claim 1, further comprising a plurality of input and output data holding means corresponding to a plurality of data processing units, and wherein a high-speed rendering process is achieved by simultaneously processing the plurality of data processing units.

5. A rendering method for forming an image on a bitmap memory by logically operating a source image and data on the bitmap memory, comprising:

the image generation step of generating the source image;

the address generation step of generating read and write addresses of the bitmap memory;

the DMA read step of directly reading out data from the bitmap memory in accordance with the generated address;

the input data holding step of holding the data read from the bitmap memory in an input memory;

the logic operation step of making a logic operation on the basis of the read data and data of the source image;

the output data holding step of holding the logically operated data in an output memory; and the DMA write step of writing the data held in the output memory in the bitmap memory in accordance with the generated address, wherein a data input process for writing data corresponding to an address generated at a first timing, a logic operation process for performing the logic operation of data corresponding to an address generated at a second timing, and an output process for reading out data corresponding to an address generated at a third timing, are processed parallel to each other, wherein the third timing is newer than the second timing; and wherein the first timing is older than the second timing.

6. A rendering method for forming an image on a bitmap memory by logically operating a source image and data on the bitmap memory, comprising:

the image generation step of generating the source image;

the address generation step of generating read and write addressees of the bitmap memory;

the DMA read step of directly reading out data from the bitmap memory in accordance with the generated address;

the input data holding step of holding the data read from the bitmap memory in an input memory;

the logic operation step of making a logic operation on the basis of the read data and data of the source image;

the output data holding step of holding the logically operated data in an output memory; and the DMA write step of writing the data held in the output memory in the bitmap memory in accordance with the generated address, wherein the address generation step includes the step of generating successive addresses when data that undergoes a logic operation process executed at the time of the next data input process is not last data of the current line, and generating an address of the next line when the data that undergoes the logic operation process is the last data of the current line.

7. The method according to claim 5, wherein a plurality of memories for holding data are provided, and process latency due to a memory which is not empty is removed by selectively using said plurality of memories as output or input memory.

8. The method according to claim 5, wherein a plurality of input and output memories corresponding to a plurality of data processing units are provided, and a high-speed rendering process is achieved by simultaneously processing the plurality of data processing units.

9. A storage medium that stores a rendering program for forming an image on a bitmap memory by logically operating a source image and data on the bitmap memory, said program comprising:

a code of the image generation step of generating the source image;

a code of the address generation step of generating read and write addresses of the bitmap memory;

a code of the DMA read step of directly reading out data from the bitmap memory in accordance with the generated address;

a code of the input data holding step of holding the data read from the bitmap memory in an input memory;

a code of the logic operation step of making a logic operation on the basis of the read data and data of the source image;

a code of the output data holding step of holding the logically operated data in an output memory; and a code of the DMA write step of writing the data held in the output memory in the bitmap memory in accordance with the generated address, wherein a data input process for writing data corresponding to an address generated at a first timing, a topic operation process for performing the logic operation of data corresponding to an address generated at a second timing, and an output process for reading out data corresponding to an address generated at a third timing, are processed parallel to each other, wherein the third timing is newer than the second timing, and wherein the first timing is older than the second timing.

10. A storage medium that stores a rendering program for forming an image on a bitmap memory by logically operating a source image and data on the bitmap memory, said program comprising:

a code of the image generation step of generating the source image;

a code of the address generation step of generating read and write addresses of the bitmap memory;

a code of the DMA read step of directly reading out data from the bitmap memory in accordance with the generated address;

a code of the input data holding step of holding the data read from the bitmap memory in an input memory;

a code of the logic operation step of making a logic operation on the basis of the read data and data of the source image;

a code of the output data holding step of holding the logically operated data in an output memory; and a code of the DMA write step of writing the data held in the output memory in the bitmap memory in accordance with the generated address, wherein the code of the address generation step includes the step of generating successive addresses when data that undergoes a logic operation process executed at the time of the next data input process is not last data of the current line, and generating an address of the next line when the data that undergoes the logic operation process is the last data of the current line.

11. The apparatus according to claim 1, further comprising output means for outputting the image formed on the bitmap memory.

12. The apparatus according to claim 1, wherein said output means includes a printer.

13. The apparatus according to claim 1, wherein said output means includes a display unit.

14. A storage medium that stores a rendering program for forming an image on a bitmap memory by logically operating a source image and data on the bitmap memory, said program comprising:

a code of the image generation step of generating the source image;

a code of the address generation step of generating read and write addresses of the bitmap memory;

a code of the read step of reading out data from the bitmap memory in accordance with the generated address;

a code of the input data holding step of holding the data read from the bitmap memory in an input memory;

a code of the logic operation step of making a logic operation on the basis of the read data and data of the source image;

a code of the output data holding step of holding the logically operated data in an output memory; and a code of the write step of writing the data held in the output memory in the bitmap memory in accordance with the generated address, wherein a data input process for writing data corresponding to an address generated at a first timing, a logic operation process for performing the logic operation of data corresponding to an address generated at a second timing, and an output process for reading out data corresponding to an address generated at a third timing, are processed parallel to each other, wherein the third timing is newer than the second timing, and wherein the first timing is older than the second timing.

15. The apparatus according to claim 1, further comprising a print engine for printing based on the data stored in the bit map memory.

\* \* \* \* \*

UNITED STATES PATENT AND TRADEMARK OFFICE
CERTIFICATE OF CORRECTION

PATENT NO. : 6,628,289 B1
DATED : September 30, 2003
INVENTOR(S) : Murata

It is certified that error appears in the above-identified patent and that said Letters Patent is hereby corrected as shown below:

Column 6,
Line 67, "read," should read -- read --.

Column 7,
Line 67, "thee" should read -- the --.

Column 13,
Line 54, "(e.g.," should read -- (e.g., --.

Column 16,
Line 58, "topic" should read -- logic --.

Signed and Sealed this

Seventeenth Day of August, 2004

JON W. DUDAS
*Acting Director of the United States Patent and Trademark Office*